United States Patent
Draganov et al.

(10) Patent No.: US 6,667,831 B2
(45) Date of Patent: Dec. 23, 2003

(54) COMPACT TELESCOPE

(76) Inventors: Vladimir Draganov, #73-1140 Falcon Dr., Coquitiam, British Columbia (CA), V3E 2K1; Robert T. Carlson, #14343-32B Avenue, Surrey, British Columbia (CA), V4P 2K6; Robert L Kehr, 5229 Horned owl Way, Parker, CO (US) 80134; Derek G Montgomery, 1702-320 Royal Avenue, New Westminster, British Columbia (CA), V3L 5C6; Pablo Bandera, 701-1099 Marinaside Crescent, Vancouver, British Columbia (CA), V6Z 2Z3; Daryl G James, 3457 Amberly Pl, Vancouver, British Columbia (CA), V5S 4P9

( * ) Notice: Subject to any disclaimer, the term of this patent is extended or adjusted under 35 U.S.C. 154(b) by 30 days.

(21) Appl. No.: 10/093,865

(22) Filed: Mar. 7, 2002

(65) Prior Publication Data
US 2003/0169493 A1 Sep. 11, 2003

(51) Int. Cl.$^7$ ............................................. G02B 23/00
(52) U.S. Cl. ...................... 359/399; 359/365; 359/730; 359/858
(58) Field of Search .................................. 359/364, 365, 359/399, 401, 727, 730, 732, 857, 858

(56) References Cited

U.S. PATENT DOCUMENTS

| | | | | |
|---|---|---|---|---|
| 4,645,314 A | * | 2/1987 | Schroder | 359/365 |
| 5,793,538 A | * | 8/1998 | Cameron et al. | 359/731 |
| 5,930,055 A | * | 7/1999 | Eisenberg | 359/728 |

* cited by examiner

*Primary Examiner*—Mark A. Robinson
(74) *Attorney, Agent, or Firm*—Fulbright & Jaworski L.L.P.

(57) ABSTRACT

A compact telescope having a modified Gregorian design comprising three reflecting surfaces. The first reflecting surface is concave and is defined by an outer perimeter and an inner perimeter. The curvature of the first reflecting surface defines a focal plane of the first reflecting surface. The second reflecting surface is optically coupled to the first reflecting surface and is disposed between the first reflecting surface and the focal plane defined by the first reflecting surface. The third reflecting surface is concave and is disposed within the inner perimeter of the first reflecting surface. The curvature of the third reflecting surface is greater than the curvature of the first reflecting surface. The third reflecting surface is optically coupled to the first reflecting surface by the second reflecting surface. An aperture is disposed within the third reflecting surface. Thus light incident upon the first reflecting surface is directed through the aperture.

25 Claims, 3 Drawing Sheets

COMPACT TELESCOPE

BACKGROUND OF THE INVENTION

1. Field of the Invention

The field of the present invention is telescopes, and in particular Gregorian telescopes.

2. Background

Gregorian telescopes are often used for applications in which an upright image is needed. Gregorian telescopes have the additional advantage of not creating strong optical aberrations in images. However, the length needed for the optics of Gregorian telescopes may make such designs difficult or impossible to use in certain applications.

A Gregorian telescope has a primary mirror and a secondary mirror, with the distance between the primary and secondary mirrors being greater than the focal length of the primary mirror. Thus, a Gregorian telescope is necessarily long compared to other telescope designs, such as a Cassegrain telescope, which can have overall lengths that are much less than the focal length of the primary mirror. Other more compact telescope designs, however, may give inverted images and may be more difficult to manufacture if a convex mirror is part of the design. As is generally known by those skilled in the art, it is more difficult to test the optical quality of convex mirrors, such as those used in a Cassegrain telescope, than it is to test the optical quality of concave mirrors. Therefore, for certain applications, Gregorian telescopes have desirable advantages over other telescope designs.

SUMMARY OF THE INVENTION

The present invention is directed to a compact telescope of a modified Gregorian design. The modifications to the traditional Gregorian telescope reduce the overall length of the telescope while still maintaining certain benefits of the Gregorian design (e.g., upright image, minor to moderate optical aberrations, and concave mirrors). The compact telescope comprises three optically coupled reflecting surfaces. The first reflecting surface is concave and defined by an outer perimeter and an inner perimeter. The curvature of the first reflecting surface defines a focal plane of the first reflecting surface. The second reflecting surface is optically coupled to the first reflecting surface and disposed between the first reflecting surface and the focal plane. The third reflecting surface is optically coupled to the first reflecting surface by the second reflecting surface and disposed within the inner perimeter of the first reflecting surface. The third reflecting surface is concave and has a curvature that is greater than the curvature of the first reflecting surface. An aperture is included in the third reflecting surface.

In a first separate aspect of the present invention, the first reflecting surface is annular and the second and third reflecting surfaces are radially defined. The second and third reflecting surfaces have equal diameters that are preferably approximately one-third the outer diameter of the first reflecting surface. The size and shape of these reflecting surfaces maximize the viewable light reflected within the telescope while minimizing the central obscuration caused by the second reflecting surface and/or the third reflecting surface.

In a second separate aspect of the present invention, the first and third surfaces form an integral unit. This integral unit includes an annular outer portion and a radially defined inner portion, with the inner portion having a greater concave curvature than the outer portion. The outer portion functions as the first reflecting surface and the inner portion functions as the third reflecting surface. By forming the first and third surfaces as an integral unit, manufacturing techniques may be employed that help reduce optical aberrations due to imprecise alignment of the reflective surfaces.

In a third separate aspect of the present invention, the second reflecting surface may comprise a steering mirror. The steering mirror may be planar or curved. By including a steering mirror with a large radius of curvature, the optical performance of the compact telescope may be improved.

In a fourth separate aspect of the present invention, any of the foregoing aspects may be employed in combination.

Accordingly, it is an object of the present invention to provide a compact telescope based on modifications to the traditional Gregorian design. Other objects and advantages will appear hereinafter.

BRIEF DESCRIPTION OF THE DRAWINGS

In the drawings, wherein like reference numerals refer to similar components.

DETAILED DESCRIPTION OF THE PREFERRED EMBODIMENTS

Figure 1:
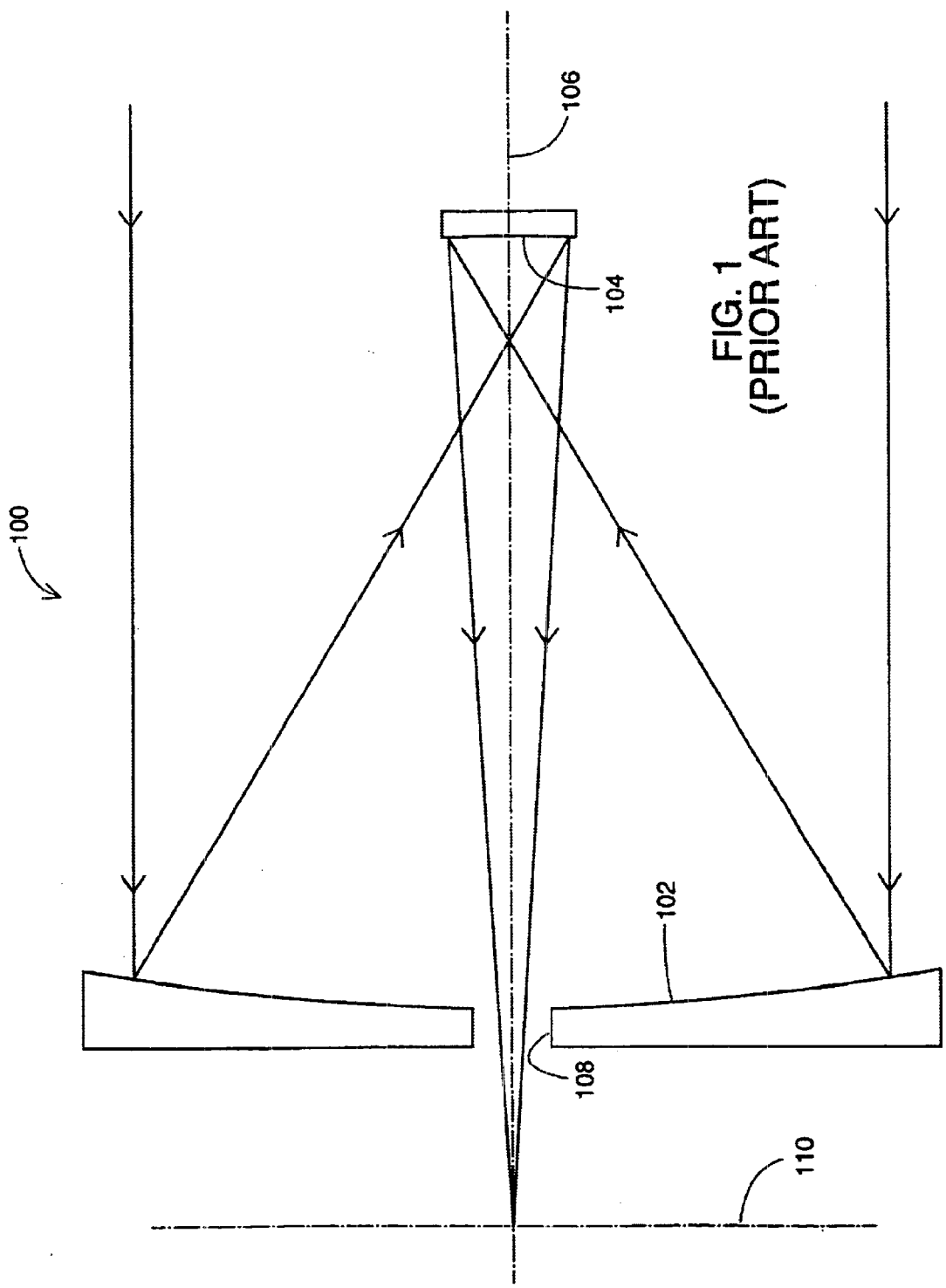
FIG. 1 is a sectional illustration of a Gregorian telescope according to the prior art.

Turning in detail to the drawings, FIG. 1 illustrates a traditional Gregorian telescope 100 according to the prior art. The Gregorian telescope 100 has a concave primary mirror 102 and a concave secondary mirror 104. In many traditional Gregorian telescopes, the primary mirror has a parabolic curvature and the secondary mirror has an elliptical curvature. The secondary mirror 104 is disposed outside the focal plane of the primary mirror 102, and the mirrors share a common optical axis 106. The primary mirror 102 reflects light from a far field and directs the light towards the secondary mirror 104. The secondary mirror 104 is appropriately sized and positioned so that light reflecting off the primary mirror 102 is incident on the secondary mirror 104. The secondary mirror 104 reflects light and directs it through an aperture 108 in the primary mirror 102 that is centered about the optical axis 106. The light is thereafter imaged at the focal plane 110 of the compact telescope for advantageous use.

Figure 2:
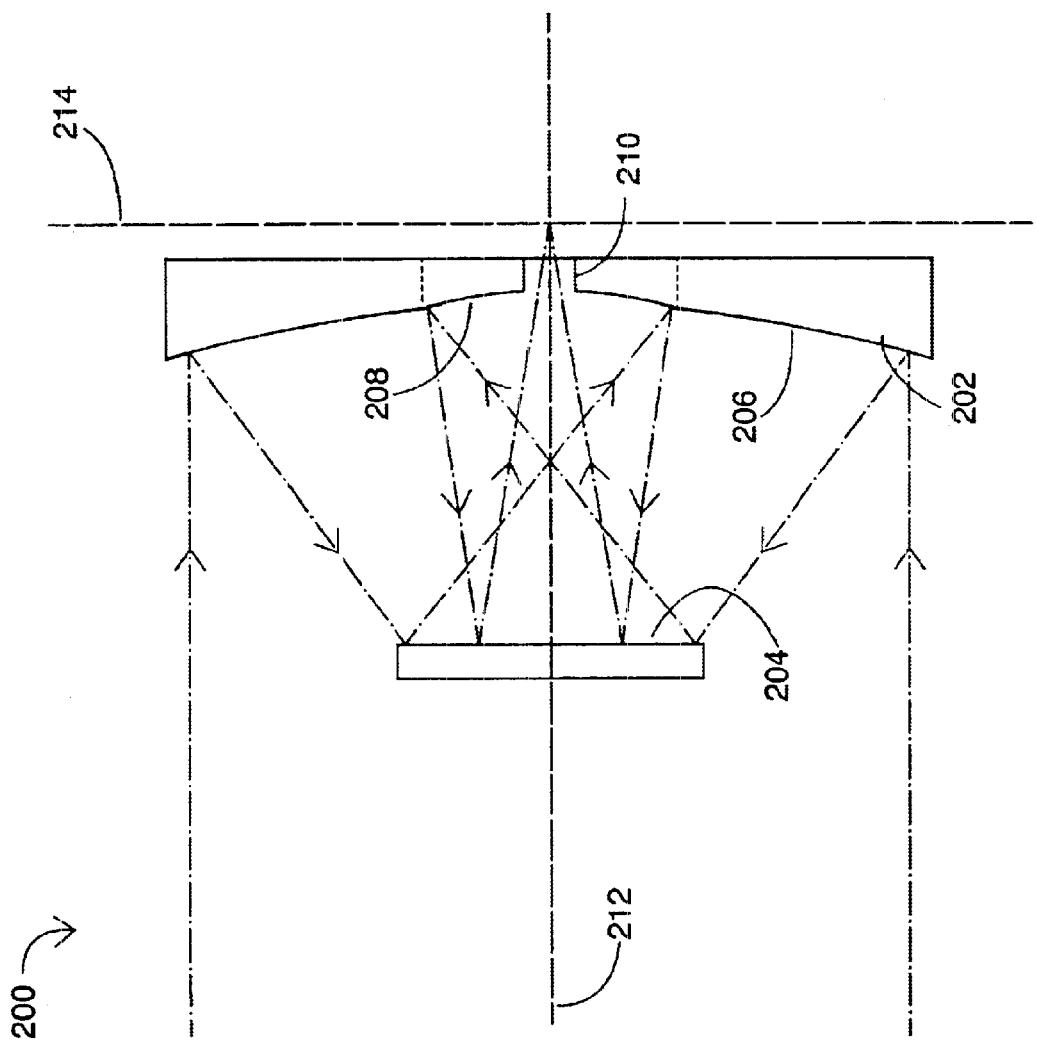
FIG. 2 is a sectional illustration of a compact telescope in accordance with an embodiment of the present invention.

FIG. 2 illustrates an embodiment of a compact telescope 200 according to the present invention. The compact telescope 200 comprises a first reflecting surface 202 and a radially defined second reflecting surface 204. The first reflecting surface 202 includes an annular outer portion 206, a radially defined inner portion 208, and a radially defined aperture 210. Other shapes may be used for these elements of the compact telescope, however, alternative shapes may increase the complexity of the optics.

The outer portion 206 of the first reflecting surface 202 is the functional equivalent of the primary mirror in a traditional Gregorian telescope, while the inner portion 208 is the functional equivalent of the secondary mirror. Therefore, hereinafter, the term "primary mirror", as it relates to a compact telescope, is used interchangeably with the outer portion 206 of the first reflecting surface. Likewise, the term "secondary mirror", as it relates to a compact telescope, is used interchangeably with the inner portion 208 of the first reflecting surface. The primary and secondary mirrors 206, 208 are both concave, with the curvature of the secondary mirror 208 being greater than the curvature of the primary mirror 206. In FIG. 2, both the primary mirror 206 and the secondary mirror 208 have elliptical curvatures (i.e., conic between −1 and 0). Those skilled in the art will recognize that with both mirrors having elliptical curvatures, correcting for both spherical and coma aberrations is facilitated without the need for additional optical elements. In an alternative embodiment, the primary mirror 206 may have a parabolic curvature (i.e., conic equal to −1) and the secondary mirror 208 may have an elliptical curvature. Other curvatures may also be used for the primary and secondary mirrors 206, 208 of the compact telescope.

The optical axes 212 of the primary and secondary mirrors 206, 208 are coincidental. Additionally, the aperture 210 and the second reflecting surface 204 are centered upon the coincident optical axes 212. Non-coincidental and/or off-axis optics may be employed, however, coincident optical axes reduce complications in aligning the optical elements and simplify the optics of the compact telescope.

In the embodiment of FIG. 2, the primary and secondary mirrors 206, 208 form the integral first reflecting surface 202. Such a double-curved mirror facilitates manufacturing and optical axis alignment of each curvature on the first reflecting surface 202. This is important because greater errors in axis alignment result in greater optical aberrations. For example, a double-curved mirror may be manufactured using diamond turning or other appropriate equipment that is frequently used to create high quality mirrors. With the appropriate manufacturing equipment, the primary and secondary mirrors may be manufactured sequentially using a single piece of equipment without realigning the equipment to obtain coincidental optical axes.

Alternatively, in lieu of a double curved mirror, the compact telescope may comprise a first reflecting surface having an annular shape (the primary mirror), with a third reflecting surface (the secondary mirror) disposed within the inner radius of the first reflecting surface. The curvatures of this alternative embodiment for the first and third reflecting surfaces are the same as the curvatures for the aforementioned outer and inner portions, respectively.

Returning to FIG. 2, the second reflecting surface 204 is a planar surface, hereinafter referred to as the "folding mirror". The folding mirror 204 optically couples the primary mirror 206 to the secondary mirror 208. The folding mirror 204 is disposed between the first reflecting surface 202 and the focal plane of the primary mirror 206. Thus, light from a far field may enter the primary aperture of the compact telescope 200 and reflect off the primary mirror 206 towards the folding mirror 204. The folding mirror 204 reflects such light towards the secondary mirror 208, and the secondary mirror 208 reflects the light back towards the folding mirror 204. Upon this second reflection from the folding mirror 204, the light passes through the aperture 210. Light emerging from the aperture 210 creates an upright image at the focal plane 214 of the compact telescope that may be advantageously used.

Alternative embodiments of the compact telescope may include a curved folding mirror. A curved folding mirror preferably has a high radius of curvature, such as a radius of 1 meter or more. Smaller curvatures may also be employed. In another alternative embodiment, the folding mirror comprises a steering mirror. The steering mirror may have a planar or curved reflective surface. A steering mirror having a curved reflective surface may help improve the optics of a compact telescope when the optical axes of the primary and secondary mirrors are imprecisely aligned.

Figure 3:
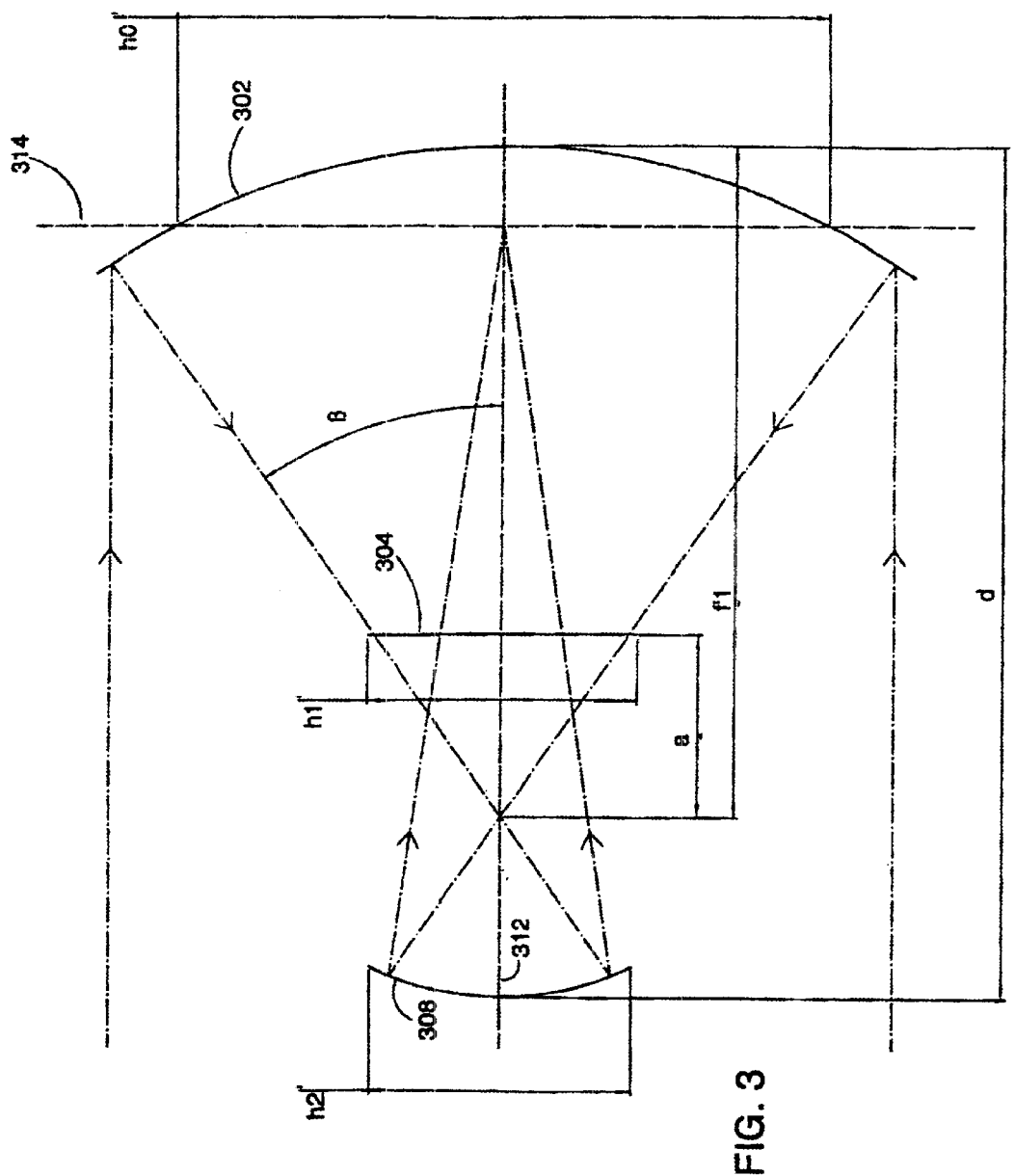
FIG. 3 is a diagrammatic illustration of the compact telescope of FIG. 2.

FIG. 3 is a diagrammatic representation of the compact telescope for purposes of estimating the preferred geometrical relationships between the various elements of the compact telescope. The following set of equations and the accompanying description sets forth these relationships:

$$f_1 = r_0/2;$$

$$a = f_1 - d/2;$$

$$\tan(\beta) = h_0/(2 f_1);$$

$$h_1 = 2 \cdot \tan(\beta) \cdot a = a \cdot h_0/f_1;$$

and $$h_2 = 2 \cdot (d - f_1) \cdot \tan(\beta) = h_0 \cdot (d - f_1)/f_1;$$

where $f_1$ is the focal length of the primary mirror 302; $r_0$ is the radius of curvature of the primary mirror 302; a is the distance between the folding mirror 304 and the focal plane of the primary mirror 302; d is the effective optical distance between the primary mirror 302 and the secondary mirror 308 along the optical axis 312; $\beta$ is the beam angle of light, relative to the optical axis 312, after reflecting off the primary mirror 302; $h_0$ is the outer diameter of the primary mirror 302; $h_1$ is the diameter of the folding mirror 304; and $h_2$ is the diameter of the secondary mirror 308. Those skilled in the art may recognize alternative geometrical relationships, other than those set forth above, that may be advantageously employed.

In FIG. 3, the compact telescope is represented in a format similar to a traditional Gregorian telescope. The focal plane 314 of the compact telescope is shown as a dashed line. Light rays are shown passing through the folding mirror 304, which is located approximately halfway between the primary mirror 302 and the secondary mirror 308. The diameter of the folding mirror 304 is preferably equal to the cone diameter of light at the position of the folding mirror 304. The positions of the folding mirror 304 and the secondary mirror 308, relative to the primary mirror 302, are based upon the parameters of the compact telescope as defined by the above relationship equations.

The above equations may be used to determine the geometrical relationships between the various elements of a compact telescope using paraxial approximations. Once the approximate geometrical relationships are determined, the curvature of the mirrors may be determined and the geometry optimized for the particular design. Determining the curvature of the mirrors and optimizing the geometry may be accomplished by using mathematical relationships that are well known to those skilled in the art, or alternatively by using optical design software such as ZEMAX®, from Focus Software, Inc. of Tucson, Ariz.

When designing a compact telescope, factors to consider include the focal length of the telescope, the diameter of the primary mirror, the diameter of the secondary mirror, the diameter of the folding mirror, the total length of the telescope, and any necessary corrections for optical aberrations. In addition to a compact design, the foregoing description of the compact telescope yields other design advantages. For example, one design advantage is achieved when the diameters of the inner portion and the second reflecting surface are identical and equal to one-third the outer diameter of the outer portion. Such a relationship minimizes the central obscuration caused by the second reflecting surface and inner portion while maximizing use of the reflective surfaces in the compact telescope. Those skilled in the art will recognize additional design advantages for the compact telescope described herein.

Table 1 lists the parameters of an optimized compact telescope that follows the above design considerations. In this example, the curvatures of the primary and secondary mirrors are selected to reduce optical aberrations such as spherical aberration, and coma, among others. The parameters listed in Table 1 are based on a compact telescope having a normalized focal distance, $F_0$, of 1 unit. The unit may be any appropriate unit of measurement, such as inches, centimeters, or meters, among others. Thus, the parameters listed in Table 1 are also unit independent, making the compact telescope defined by these parameters fully scalable, regardless of the unit of measurement, to a desired size and/or magnification.

TABLE 1

| Surface & Surface Type | Radius of Curvature | Thickness | Diameter | Conic |
|---|---|---|---|---|
| Primary Mirror | −0.418571 | −0.14 | 0.36 | −0.9759 |
| Folding Mirror | ∞ | 0.15 | 0.12 | 0 |
| Secondary Mirror | −0.1334908 | −0.15 | 0.12 | −0.4629 |
| Folding Mirror | ∞ | 0.236 | 0.12 | 0 |

The parameters listed in Table 1 follow the sign convention generally accepted for optical systems and are specified in a format commonly used in connection with optical design software such as the aforementioned Zemax software. In this example, the folding mirror is listed twice in the table because light is incident upon the folding mirror twice. The thickness column in Table 1 specifies the distance light travels along the optical axis between the optical surfaces of the compact telescope. The thickness in the second folding mirror row indicates the distance light travels between the second reflection off the folding mirror and the focal plane of the compact telescope.

Thus, a compact telescope is disclosed. While embodiments of this invention have been shown and described, it would be apparent to those skilled in the art that many more modifications are possible without departing from the inventive concepts herein. The invention, therefore, is not to be restricted except in the spirit of the following claims.

What is claimed is:

1. A compact telescope comprising:
   a concave first reflecting surface having an inner perimeter and an outer perimeter, the curvature of the first reflecting surface defining a focal plane of the first reflecting surface;
   a second reflecting surface optically coupled to the first reflecting surface and disposed between the first reflecting surface and the focal plane of the first reflecting surface; and
   a concave third reflecting surface disposed within the inner perimeter of the first reflecting surface and optically coupled to the first reflecting surface by the second reflecting surface, the third reflecting surface including an aperture, wherein the curvature of the third reflecting surface is greater than the curvature of the first reflecting surface.

2. The compact telescope of claim 1, wherein the second reflecting surface is planar.

3. The compact telescope of claim 1, wherein first reflecting surface and the third reflecting surface have a common optical axis.

4. The compact telescope of claim 3, wherein the first reflecting surface is annular and the second and third reflecting surfaces are radially defined.

5. The compact telescope of claim 4, wherein the second reflecting surface and the third reflecting surface have equal diameters.

6. The compact telescope of claim 5, wherein the second reflecting surface has a diameter that is one-third the diameter of the first reflecting surface.

7. The compact telescope of claim 1, wherein the first reflecting surface and the third reflecting surface form an integral unit.

8. The compact telescope of claim 1, wherein the second reflecting surface comprises a steering mirror.

9. The compact telescope of claim 1, wherein the curvature of the first reflecting surface is elliptical.

10. The compact telescope of claim 1, wherein the curvature of the second reflecting surface is elliptical.

11. A compact telescope comprising:
    a first reflecting surface having an annular and concave outer portion, a radially defined and concave inner portion, and an aperture within the inner portion, wherein the curvature of the outer portion defines a focal plane of the outer portion and the curvature of the inner portion is greater than the curvature of the outer portion; and
    a second reflecting surface disposed between the first reflecting surface and the focal plane, wherein the second reflecting surface optically couples the inner portion of the first reflecting surface to the outer portion of the first reflecting surface.

12. The compact telescope of claim 11, wherein the second reflecting surface is planar.

13. The compact telescope of claim 11, wherein the inner and outer portions of the first reflecting surface have a common optical axis.

14. The compact telescope of claim 13, wherein the second reflecting surface is radially defined and centered upon the optical axis.

15. The compact telescope of claim 14, wherein the second reflecting surface and the inner portion of the first reflecting surface have equal diameters.

16. The compact telescope of claim 15, wherein the second reflecting surface has a diameter that is one-third the diameter of the first reflecting surface.

17. The compact telescope of claim 11, wherein the second reflecting surface comprises a steering mirror.

18. The compact telescope of claim 11, wherein the curvature of the outer portion is elliptical.

19. The compact telescope of claim 11, wherein the curvature of the inner portion is elliptical.

20. A compact telescope comprising:
    a first reflecting surface having an annular and concave outer portion, a radially defined and concave inner portion, and a radially defined aperture within the inner portion, wherein the curvature of the outer portion defines a focal plane of the outer portion and the curvature of the inner portion is greater than the curvature of the outer portion, and wherein the outer and inner portions have a common optical axis with the aperture being centered upon the optical axis; and a radially defined folding mirror disposed between the first reflecting surface and the focal plane, wherein the folding mirror is centered upon the optical axis and optically couples the inner portion of the first reflecting surface to the outer portion of the first reflecting surface.

21. The compact telescope of claim 20, wherein the folding mirror and the inner portion of the first reflecting surface have equal diameters.

22. The compact telescope of claim 20, wherein the folding mirror has a diameter that is one-third the diameter of the first reflecting surface.

23. The compact telescope of claim 20, wherein the folding mirror comprises a steering mirror.

24. The compact telescope of claim 20, wherein the curvature of the outer portion is elliptical.

25. The compact telescope of claim 20, wherein the curvature of the inner portion is elliptical.

* * * * *